United States Patent [19]

Unger

[11] Patent Number: 4,915,556
[45] Date of Patent: Apr. 10, 1990

[54] HOLD-DOWN BRACKET FOR PICKUP TRUCKS

[76] Inventor: Eric Unger, EIP Equipment & Safety Products Ltd., P.O. Box 165, Clarkson Postal Station, Mississauga, Ontario, Canada, L5J 3Y1

[21] Appl. No.: 308,643

[22] Filed: Feb. 10, 1989

[51] Int. Cl.$^4$ .................... B65D 63/00; F16G 11/00; A44C 5/18

[52] U.S. Cl. .................... 410/110; 24/115 K; 24/265 CD; 410/116

[58] Field of Search .............. 410/101, 106, 107, 110, 410/112, 113, 116, 117, 123; D8/349, 354; 24/115 K, 265 CD

[56] References Cited

U.S. PATENT DOCUMENTS

| D. 254,476 | 3/1980 | Gilb | D8/349 X |
| D. 283,006 | 3/1986 | Carter et al. | D8/349 |
| 3,595,125 | 7/1971 | Jacobs | 85/76 |
| 4,316,688 | 2/1982 | Roskelley | 410/102 |
| 4,607,991 | 8/1986 | Porter | 410/116 X |

Primary Examiner—Robert J. Oberleitner
Attorney, Agent, or Firm—Ridout & Maybee

[57] ABSTRACT

A hold-down bracket is provided for releasable engagement in a post pocket of a pickup truck, having a molded U-section body which resiliently clips into the pocket and is held there by external flanges, and a retainer member, preferably tubular, which snaps into position between the limbs of the U-section to lock the latter in place and provides a passage for a rope passing through apertures in the upper portion of the limbs of the body, thus bracing the body against applied tiedown forces.

4 Claims, 3 Drawing Sheets

HOLD-DOWN BRACKET FOR PICKUP TRUCKS

FIELD OF THE INVENTION

This invention relates to hold-down brackets for trucks.

BACKGROUND OF THE INVENTION

The tops of the side walls of bodies of pickup trucks are commonly provided with rectangular sockets or post pockets primarily intended to receive posts or frame members locating a superstructure such as a truck cap.

Several proposals have been made and devices marketed for removable installation in such sockets so as to provide anchorage for ropes used to tie down a load.

U.S. Pat. No. 3,595,125 issued in July 1971 to Jacobs shows a structure which is expanded into locking engagement with such a socket by rotation of an eyebolt which provides the tie-down. The arrangement is quite simple and effective, but could be loosened by rotation of the eyebolt during use, either inadvertently or as a result of vibration when the tie-down is not in use.

U.S. Pat. No. 4,316,688 issued Feb. 23, 1982 to Roskelley shows a tie-down device which is clearly extremely robust, but which on the other hand is complex both in construction and installation, and could not be rapidly installed and removed as required.

U.S. Design Pat. No. 283,006 shows a molded plastic tie-down bracket which is both cheap to manufacture and very easily and quickly snapped in and out of engagement with a socket. For the same reason that it is easy to remove, it is however directional in its ability to sustain loads, and incorrect installation or roping may easily result in the imposition of forces on the bracket which can disengage it from a socket in which it is engaged. The strength of the bracket is also limited since the load must be sustained by a single upstanding plastic flange through which a rope hole is formed.

SUMMARY OF THE INVENTION

An object of the invention is to provide a bracket which is almost as easy to manufacture and install and uninstall as that of Design Patent No. 283,006, but which can provide substantially greater strength and security and which is not directional in its load sustaining capability.

According to the invention, a tie-down bracket for installation in a post pocket of a pickup truck, comprising a generally U-section body having a lower portion dimensioned to enter a post pocket, upper and lower flanges on an outer surface of each limb of the body and spaced to engage therebetween opposite lips of the pocket, the body being sufficiently resiliently deformable under compressive hand pressure applied to upper portions of the limbs that the lower flanges can be inserted past the opposite lips of the pocket, is improved as follows. The upper portion of each limb has an aperture for passage of a hold-down rope, and a bracing member is provided insertable between the limbs and releasable from at least one of them to hold the limbs apart with the upper and lower flanges in engagement with the lips. Preferably the bracing member is tubular and coaxial when inserted with the apertures in the limbs. Preferably also the bracing member has at least one tongue at each end engageable with a slot in a limb adjacent the aperture therein. The tongues may be provided with resilient barbs engageable through the associated slots to resist inadvertent disengagement therefrom, or preferably the bracing member is rotatable about its axis relative to the body between positions in which the tongues are respectively locked to or disengaged from the limbs.

Further features of the invention will become apparent from the following description of preferred embodiments thereof.

SHORT DESCRIPTION OF THE DRAWINGS

Figure 2:
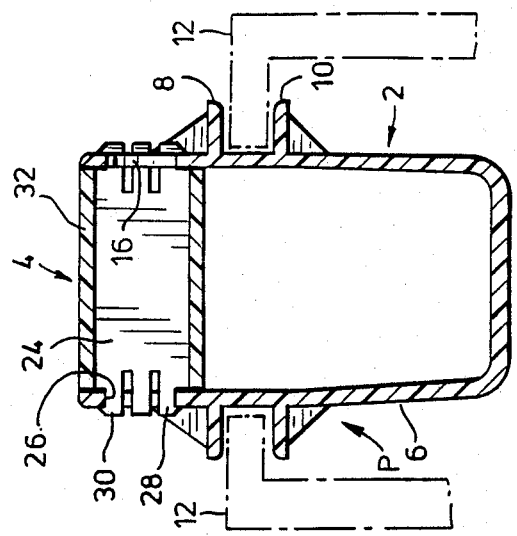
FIG. 2 is a vertical sectional view of a tiedown bracket in accordance with the invention, installed in a side wall of a pickup truck body.
Figure 1:
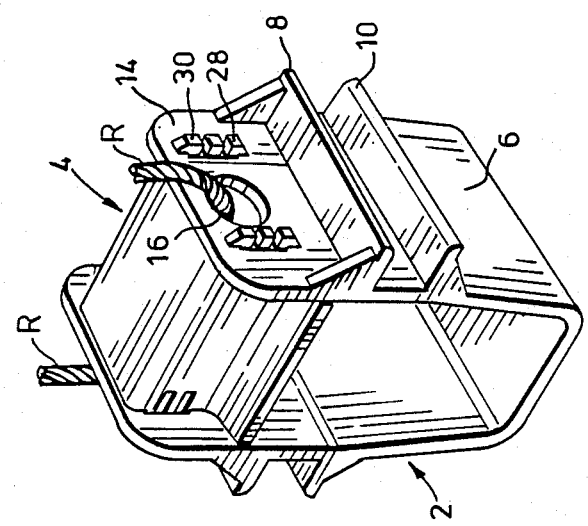
FIG. 1 is a perspective view of a first embodiment of a tie-down bracket in accordance with the invention.
Figure 3C:
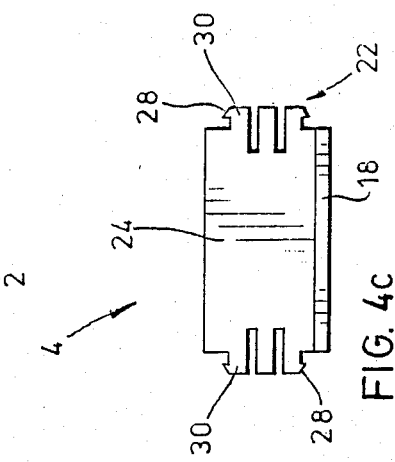
Figure 4C:
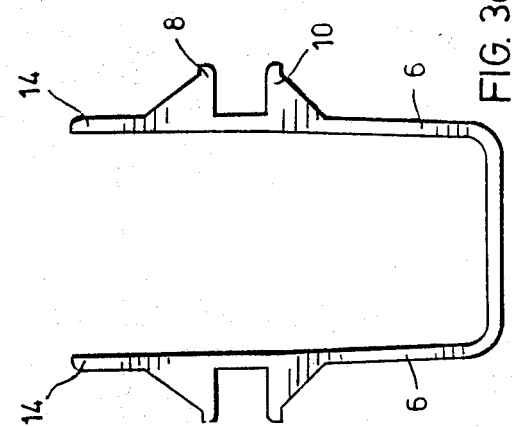
Figure 3B:
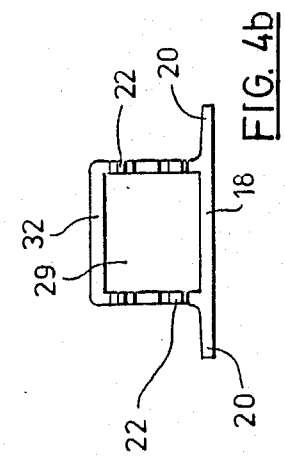
Figure 4B:
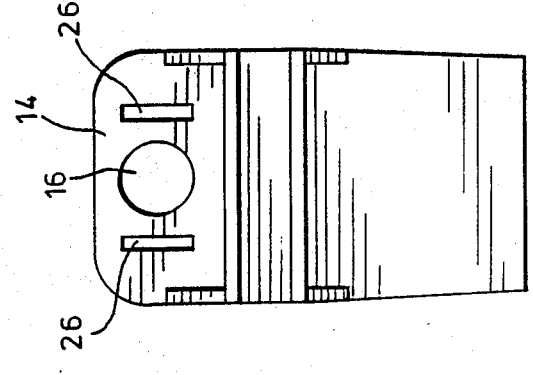
Figure 3A:
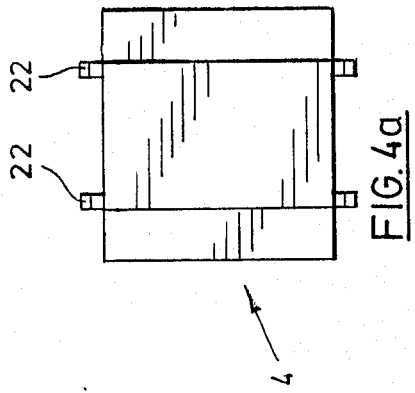
Figure 4A:
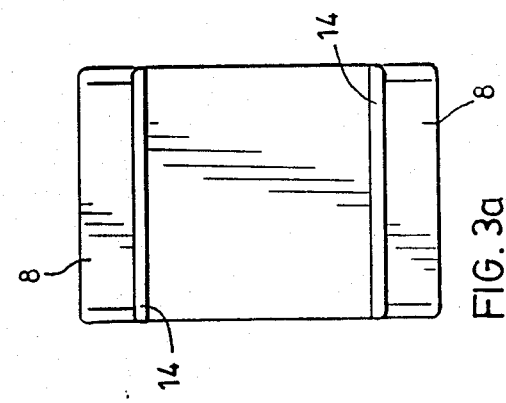
Figure 5A:
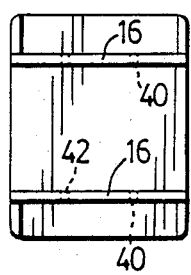
Figure 5B:
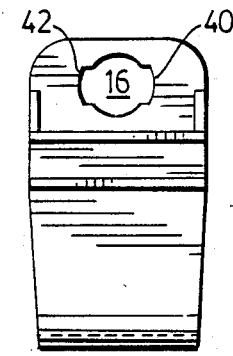
Figure 5C:
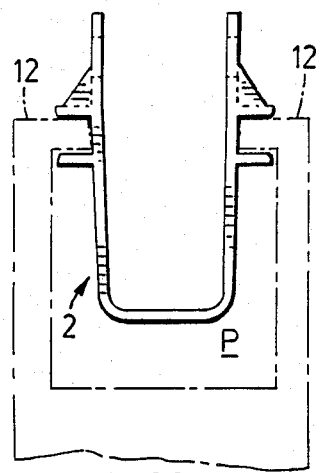
Figure 6A:
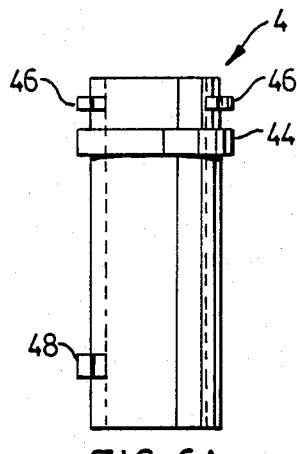
Figure 6B:
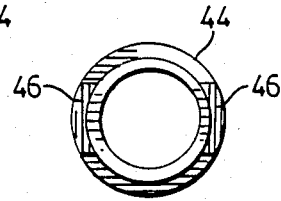
Figure 6C:
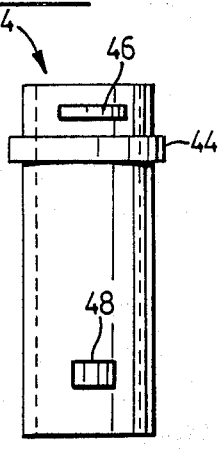

FIGS. 3a, b, and c are plan, side and end elevational views of the body of the bracket;

FIGS. 4a, b, and c are plan, side and end elevational views of the retaining member; and FIGS. 5a, b, and c and 6a, b, and c are views corresponding to those of FIGS. 3a, b, and c and 4a, b, and c of a second embodiment of bracket.

DESCRIPTION OF THE PREFERRED EMBODIMENT

The hold-down bracket shown in FIGS. 1–4 of the drawings has two main components, both molded from high tensile synthetic thermoplastic material, namely a body 2 and retainer member 4.

The body 2 is of U-section, the lateral and longitudinal dimensions of the U being such as to be a close fit within a post pocket P (see FIG. 3) of a pickup truck. Each limb 6 of the U is formed with a pair of external horizontal flanges 8 and 10, spaced so as to form a slot for receiving lips 12 defining an entrance to the pocket. The body has sufficient resilient flexibility that upper portions 14 of the limbs can be pressed towards each other by hand pressure, enough so that the flanges 10 can be moved past the lips 12 to engage the bracket in the pocket. The portions 14 of the limbs have apertures 16 for the passage of a rope or other ligament used to tie down a load on the truck.

In order to lock the body into the pocket and to resist the effect of loading on the portions 14 tending to release the body from the pocket, the bracing member 4 is snapped into place between the portions 14. The bracing member is generally tubular in form, with a rectangular cross-section in the example shown. A passage 30 through the tubular bracing member is traversed by a rope R (see FIG. 1) inserted through the apertures 16. The bracing member thus braces one portion 14 against the other in respect of loadings imposed by the rope R whilst the passage of the rope through the bracing member ensures that it cannot come free when the hold-down bracket is in use. Further bracing is provided by extending the bottom wall 18 of the bracket laterally of the bracing member to provide flanges 20 extending substantially the full width of the body 2. In order to locate the bracing member securely and prevent its accidental disengagement in the absence of a rope, extensions 22 on the ends of the side walls 24 snap into slots 26 in the body. The extensions 22 are slotted, and outer portions 30 are formed with detents 28 to retain the extensions in the slots unless released by forcing the portions 30 inwardly towards each other as the portions 14 of the body are forced apart from one another.

It will thus be understood that the bracing member 4 enables loads to be shared between both portions of the body 14, braces these portions against flexure under applied tie-down loads, and positively locks the body in the pocket, thus producing a stronger and more secure bracket which is nevertheless very quickly and easily installed and quite easily removed if desired.

Various modifications of the described embodiment are possible. The bracing member is preferably formed with a central passage 29 which is configured to align with and match in cross-section the apertures 16; this facilitates threading of a rope through the apertures. For example, the bracing member could be cylindrical, with reduced cross-section end portions entering the apertures 16. These end portions could be slotted and configured to provide the extensions 22 and detents 28. Alternatively, the bracing member need not be tubular; for example, the top wall 32 could be omitted. It may be possible in some cases to mold the bracing member in one piece with the body, the member being connected to one limb of the body by an integral hinge and snapping into engagement with a recess in the other limb so as to lock the body in place and brace it against tie-down forces.

An alternative and presently preferred embodiment is shown in FIGS. 4a, b, and c and 5a, b, and c in which the bracing member 4 is of tubular cylindrical form described further below, and the body 2 is similar to that of the previous embodiment except that the slots 26 are replaced by slots 40, 42 in the form of arcuate recesses in the peripheries of the openings 16. The opening 16 in one limb has a single recess 40, and the opening in the other limb has two recesses 42.

The bracing member 4 is generally of a diameter such as to fit within the openings 16. Near one end it has an annular flange 44 which limits its insertion into such an opening, and two arcuate tongues 46 outward of the flange position so that when appropriately aligned they can be passed through the slots 42 in one limb. The member 4 can then be rotated about its axis to lock the tongues against the outside of the opening and lock the member 4 against the portion 14 of the limb.

Near the other end of the member 4 is a further arcuate tongue 48 which forms an abutment preventing inward movement of the other limb of the body relative to the member 4 unless the member 4 is rotated to a position in which the tongue 48 is aligned with the slot or recess 40, in which position the limbs of the body 2 may be pressed towards each other to release the body from the lips 12 defining the entrance of a post pocket.

I claim:

1. In a tie-down bracket for installation in a post pocket of a pickup truck, comprising a generally U-section body having a lower portion dimensioned to enter the post pocket, upper and lower flanges on an outer surface of each limb of the body and spaced to engage therebetween opposite lips defining an entrance to the pocket, the body being sufficiently resiliently deformable inwardly under hand pressure applied to upper portions of the limbs that the lower flanges can be inserted past the opposite lips; the improvement wherein:
   the upper portion of each limb has an aperture for passage of a hold-down rope; and
   a bracing member is provided insertable between the limbs and releasable from at least one of them, to hold the limbs apart with the upper and lower flanges in engagement with the lips, the bracing member being tubular, and coaxial when inserted with the apertures in the limbs for passage of the hold-down rope.

2. A tie-down bracket according to claim 1, wherein the bracing member has at least one tongue at each end engageable with a slot in a limb adjacent the aperture therein.

3. A tie-down bracket according to claim 2, wherein the tongues are provided with detents resiliently engageable through the associated slots to resist inadvertent disengagement therefrom.

4. A tie-down bracket according to claim 2, wherein the bracing member is cylindrical, and rotatable about its axis relative to the body between a position in which the tongues are locked in engagement with the limbs, and a position in which the tongues are disengaged from the limbs.

* * * * *